United States Patent
Armbruster et al.

(10) Patent No.: US 12,492,974 B2
(45) Date of Patent: Dec. 9, 2025

(54) SORBENT COMPOSITION FOR PRE-ANALYTICAL TREATMENT OF SAMPLES

(71) Applicant: IMMUNDIAGNOSTIK AG, Bensheim (DE)

(72) Inventors: Franz-Paul Armbruster, Bobenheim-Roxheim (DE); Anja Helmschrodt, Bensheim (DE)

(73) Assignee: IMMUNDIAGNOSTIK AG, Bensheim (DE)

( * ) Notice: Subject to any disclaimer, the term of this patent is extended or adjusted under 35 U.S.C. 154(b) by 205 days.

(21) Appl. No.: 17/269,152

(22) PCT Filed: Aug. 20, 2019

(86) PCT No.: PCT/EP2019/072289
§ 371 (c)(1),
(2) Date: Feb. 17, 2021

(87) PCT Pub. No.: WO2020/038954
PCT Pub. Date: Feb. 27, 2020

(65) Prior Publication Data
US 2021/0404920 A1    Dec. 30, 2021

(30) Foreign Application Priority Data
Aug. 20, 2018    (DE) ............... 10 2018 120 153.2

(51) Int. Cl.
*G01N 1/40*    (2006.01)
*B01D 15/34*    (2006.01)
(Continued)

(52) U.S. Cl.
CPC ............. *G01N 1/405* (2013.01); *B01D 15/34* (2013.01); *B01D 15/3809* (2013.01);
(Continued)

(58) Field of Classification Search
CPC .............. G01N 33/544; G01N 33/549; G01N 33/5436; G01N 33/525; G01N 33/526;
(Continued)

(56) References Cited

U.S. PATENT DOCUMENTS

| 4,257,884 A | 3/1981 | Lim |
| 4,352,883 A | 10/1982 | Lim |
| 4,744,933 A * | 5/1988 | Rha ...................... A61K 9/5036 |
| | | 424/455 |

FOREIGN PATENT DOCUMENTS

| EP | 0280155 A1 | 8/1988 |
| EP | 2631247 A1 | 8/2013 |

(Continued)

OTHER PUBLICATIONS

Goel et al. "Plasticity within the Antigen Combining Site May Manifest as Molecular Mimicry in the Humoral Immune Response," The Journal of Immunology (2004), 173(12):7358-7367 (Year: 2004).*

(Continued)

*Primary Examiner* — Christopher L Chin
*Assistant Examiner* — Ellis Follett Lusi
(74) *Attorney, Agent, or Firm* — Birch, Stewart, Kolasch & Birch, LLP

(57) ABSTRACT

A method for pre-analytical treatment of a serum or plasma sample from a patient suspected of suffering from oxidative stress, which includes contacting the sample with one or more microcapsules having a gelled alginate core and a semipermeable coating, where the alginate core includes dispersed receptors against an oxidised human parathyroid hormone (PTH) peptide. The semipermeable membrane can be obtained by layer-by-layer deposition of polycationic and (Continued)

polyanionic macromolecules onto the gelled core, following by hardening, crosslinking and co-acervation of the macroionic phases.

10 Claims, 3 Drawing Sheets

Specification includes a Sequence Listing.

(51) Int. Cl.

| | | |
|---|---|---|
| *B01D 15/38* | (2006.01) | |
| *B01J 13/10* | (2006.01) | |
| *B01J 13/22* | (2006.01) | |
| *B01J 20/24* | (2006.01) | |
| *B01J 20/26* | (2006.01) | |
| *B01J 20/28* | (2006.01) | |
| *B01J 20/32* | (2006.01) | |
| *C07K 1/22* | (2006.01) | |

(52) U.S. Cl.
CPC .............. *B01J 13/10* (2013.01); *B01J 13/22* (2013.01); *B01J 20/24* (2013.01); *B01J 20/261* (2013.01); *B01J 20/262* (2013.01); *B01J 20/28021* (2013.01); *B01J 20/3212* (2013.01); *B01J 20/3289* (2013.01); *C07K 1/22* (2013.01); *G01N 1/4005* (2013.01); *B01J 2220/54* (2013.01)

(58) Field of Classification Search
CPC ................ G01N 1/405; G01N 1/4005; G01N 2333/635; G01N 33/74; B01D 15/34; B01D 15/3809; B01J 13/10; B01J 13/22; B01J 20/24; B01J 20/261; B01J 20/262; B01J 20/28021; B01J 20/3212; B01J 20/3289; B01J 2220/54; B01J 13/206; B01J 13/14; C07K 1/22; C07K 2317/34; C07K 2317/40; C07K 16/26

USPC .................................................. 436/535, 170
See application file for complete search history.

(56) References Cited

FOREIGN PATENT DOCUMENTS

| | | |
|---|---|---|
| WO | 2006089572 A1 | 8/2006 |
| WO | 2008045806 A2 | 4/2008 |
| WO | 2011072557 A1 | 6/2011 |

OTHER PUBLICATIONS

Lloyd et al. "Modelling the human immune response: performance of a 1011 human antibody repertoire against a broad panel of therapeutically relevant antigens," Protein Engineering, Design & Selection (2009), 22(3):159-168 (Year: 2009).*

Edwards et al. "The remarkable flexibility of the human antibody repertoire; isolation of over one thousand different antibodies to a single protein, BlyS," Journal of Molecular Biology (2003), 334:103-118 (Year: 2003).*

Harlow, E. and Lane, D., Antibodies: A Laboratory Manual (1988) Cold Spring Harbor Laboratory Press, Cold Spring Harbor, NY, pp. 23-26 (Year: 1988).*

Lederman et al "A single amino acid substitution in a common African allele of the CD4 molecule ablates binding of the monoclonal antibody OKT4" Mol Immunol. Nov. 1991; 28(11):1171-81 (Year: 1991).*

Colman et al Research in Immunology, 1994; 145(1):33-36) teach that amino acid changes in an antigen can effectively abolish antibody antigen binding entirely (p. 33-34). (Year: 1994).*

Schneider et al. Multilayer capsules: a promising microencapsulation system for transplantation of pancreatic islets. Biomaterials. Jul. 2001;22(14):1961-70 (Year: 2001).*

Degroot et al. Encapsulation of urease in alginate beads and protection from α-chymotrypsin with chitosan membranes. Enzyme and Microbial Technology, vol. 29, Issues 6-7, pp. 321-327, ISSN 0141-0229, 2001. (Year: 2001).*

\* cited by examiner

SEQUENCE LISTING

<160> NUMBER OF SEQ ID NOS: 1

<210> SEQ ID NO 1
<211> LENGTH: 115
<212> TYPE: PRT
<213> ORGANISM: Homo sapiens

<400> SEQUENCE: 1

```
Met Ile Pro Ala Lys Asp Met Ala Lys Val Met Ile Val Met Leu Ala
1               5                   10                  15

Ile Cys Phe Leu Thr Lys Ser Asp Gly Lys Ser Val Lys Lys Arg Ser
            20                  25                  30

Val Ser Glu Ile Gln Leu Met His Asn Leu Gly Lys His Leu Asn Ser
        35                  40                  45

Met Glu Arg Val Glu Trp Leu Arg Lys Lys Leu Gln Asp Val His Asn
    50                  55                  60

Phe Val Ala Leu Gly Ala Pro Leu Ala Pro Arg Asp Ala Gly Ser Gln
65                  70                  75                  80

Arg Pro Arg Lys Lys Glu Asp Asn Val Leu Val Glu Ser His Glu Lys
                85                  90                  95

Ser Leu Gly Glu Ala Asp Lys Ala Asp Val Asn Val Leu Thr Lys Ala
            100                 105                 110

Lys Ser Gln
        115
```

SORBENT COMPOSITION FOR PRE-ANALYTICAL TREATMENT OF SAMPLES

REFERENCE TO ELECTRONIC SEQUENCE LISTING

The application contains a Sequence Listing which has been submitted electronically in .XML format and is hereby incorporated by reference in its entirety. Said .XML copy, created on Aug. 2, 2024, is named "IDK00134USPC—Sequence Listing.xml" and is 2,060 bytes in size. The sequence listing contained in this .XML file is part of the specification and is hereby incorporated by reference herein in its entirety.

REFERENCE TO SEQUENCE LISTING

This application includes an electronically submitted sequence listing in .txt format. The .txt file contains a sequence listing entitled "6769-0120PUS1_ST25.txt" created on Aug. 29, 2024 and is 1,360 bytes in size. The sequence listing contained in this .txt file is part of the specification and is hereby incorporated by reference herein in its entirety.

FIELD OF THE INVENTION

The present invention relates to a sorbent composition containing microcapsules where a sorbent core material is encapsulated in a semipermeable membrane that is permeable to smaller peptides and impermeable to larger proteins, and in particular to a sorbent composition for in vitro treatment of plasma or serum prior clinical analysis.

BACKGROUND OF THE INVENTION

The parathyroid hormone (PTH) takes an essential role in the homeostasis of the calcium and phosphate contents in the circulating blood as well as in bone mineralization and bone formation. Parathyroid disorders occur when the parathyroid glands over- or under-produce parathyroid hormone (PTH) and a common endocrine disorder is hyperparathyroidism with prevalence estimates of one to seven cases per 1000 adults, and an even higher incidence and prevalence in postmenstrual women and in patients under dialysis. Elevated PTH levels result in high calcium levels in blood because of a removal of calcium from bones, an enhanced absorption of calcium from the intestines, and a decreased release of calcium into the urine. This can result in atherosclerosis and weakening of the bones (osteoporosis) in addition to nausea, fatigue, and other symptoms.

The PTH level in serum or plasma is therefore an important parameter in clinical diagnostics despite of an observed clinical inconsistency and the variability of serum PTH levels in accordance with various measurement methods (WO2014/135701, EP2775306, EP2817337, EP2631247, EP1240527). There have also been attempts for a reference procedure by means of a standard pre-analytical sampling and storage with the aim of producing a good practice guidance for PTH measurements (Hanon et al, *Sampling and storage conditions influencing the measurement of parathyroid hormone in blood samples: a systematic review*, Clin Chem Lab Med 2013; 51(10):1925-1941). Factors affecting PTH stability may include circadian and seasonal variations, metabolism, proteolytic degradation and vitamin D status, but human PTH peptides may also become deactivated in vivo by oxidation and oxidative stress. Chemically, protein oxidation is caused in vivo by reactive oxygen and nitrogen species (ROS/RNS) such as hydrogen peroxide ($H_2O_2$), nitrosative and nitrative molecules (NOS), nitrotyrosine, isoprostanes, hypochlorous acid (HOCl), free radicals such as hydroxyl radical (OH), secondary oxidation products formed during lipid peroxidation (e.g., malondialdehyde or 4-hydroxynonenal) or reactive sugars in glycation or glycoxidation reactions. Typical aetiologies and pathophysiologies for oxidative stress are smoking, dialysis treatment, diabetes (hyperglycaemia), inflammatory response, trauma, increased cell death and apoptosis, free hem, atherogenesis, microcirculatory changes, adrenergic stress, etc. An imbalance between oxidative and anti-oxidative mechanisms may occur in hidden pathologies, too numerous to be recited here. Generally, patients afflicted from uraemia and/or subject to haemodialysis suffer from a varying but mostly high degree of oxidative stress so that circulating PTH peptides may become oxidised.

Recent studies have shown that medical decisions and medication can be wrong if the level of PTH oxidation is ignored. PTH oxidation varies strongly among patients (Hocher et al. (2012) *Measuring Parathyroid Hormone (PTH) in Patients with Oxidative Stress—Do We Need a Fourth Generation Parathyroid Hormone Assay?*, PLoS ONE 7(7): e40242. doi:10.1371/journal.pone.0040242). The hitherto methods for determining the levels of non-oxidised PTH in serum or blood samples cannot be carried out by analysis automats or suffer from other disadvantages.

Two-site radioimmunoassays and ELISAs are the common techniques for measuring the level of PTH in blood. The selective masking of oxidised PTH peptides requires, however, a specific pair of monoclonal antibodies (WO2013/124462, WO2014/135701, and EP1240527). This method must compete with other established measurement methods. The state of the art, therefore, represents a problem. There is a need for an automatic pre-analytical preparation of serum or plasma samples which comprises a removal of oxidised PTH so that such treated samples can be subjected to a conventional PTH analysis, say for a determination the effective fraction of non-oxidised PTH in the sample.

SUMMARY OF THE INVENTION

Particular and preferred aspects of the invention are set out in the accompanying independent and dependent claims. Features from the dependent claims may be combined with features of the independent claims and with features of other dependent claims as appropriate and not merely as explicitly set out in the claims.

According to one aspect of the instant application, methods for obtaining a sorbent material for pre-analytical preparation of serum or plasma samples are provided as stated in claim 1 as well as microcapsules as stated in claim 8. Another aspect relates to the use of those microcapsules in a method of analysis as stated in claim 6 which provides the advantage that it can be readily implemented on current automatic analyzers and sample preparation automats.

One aspect of the present application provides a method of obtaining a sorbent material for immunological pretreatment of a biological liquid, wherein the sorbent material is characterized by microcapsules obtainable by the steps of
  (i) solubilizing antibodies in a physiological buffer containing 0.3 to 2.5 percent by weight alginic acid and dropping said antibody alginate solution in a solution containing ions of a two-valent salt to obtain sorbent cores having diameters from 0.5 to 5.0 millimetres and volumes in the range from 0.1 to 50 microliters;

(ii) immersing said sorbent cores in liquid solutions alternatingly containing either a polycationic polymer or a polyanionic polymer for a layer-by-layer electrostatic deposition of one or more oppositely charged layers to obtain macroion-rich liquid-liquid phases surrounding said sorbent cores;

(iii) maturation of the macroion-rich liquid-liquid phases by complex acervation at ambient temperatures for a period of time in an aqueous environment to obtain microcapsules consisting of sorbent cores surrounded by a hardened macroion-rich multilayer; (iv) lyophilising of said microcapsules to obtain microcapsules with a hardened macroion-rich multilayer that is permeable to proteins of a molecular weight no greater than about 100 000 Daltons;

(v) conditioning said semipermeable microcapsules and, if necessary, classification, to obtain microcapsules that can be added to biological fluids for immunological treatment and removal of peptidic components smaller than 100 000 Daltons.

In preferred embodiments, said one or more polycationic layers comprise a polycation selected from the group branched polyethylenimine, polyallylamine or polyvinyl amine having average molecular weights Mn from about 100.000 to 2.000.000 Daltons.

In an embodiment said polyanionic layers comprise a polyanion selected from the group pectin (poly-D-galacturonic acid methyl ester) having a molecular weight Mn from about 20.000 to 200.000 Daltons, polyacrylic acid having a molecular weight Mn from about 10.000 to 350.000 Daltons; carboxymethylcellulose having a molecular weight Mn from about 80.000 to 1.000.000 Daltons.

In other embodiments the multilayer membrane may have one or more intermediate layers and/or an external layer comprising a polyglycan selected from the group comprising polyaminosaccharide, chitosan, alginic acid, glycosaminoglycan, hyaluronic acid.

In preferred embodiments, said antibodies specifically bind oxidised human parathyroid hormone (PTH) peptides which has a molecular weight of 9500 Daltons or less. In most preferred embodiments, said antibodies specifically bind an epitope located on oxidised human PTH between amino acids 3 to 34.

According to preferred embodiments, said sorbent cores comprise about 1 percent by weight (w/v) alginic acid in phosphate buffered saline, pH 7,4 and monoclonal antibodies specifically binding oxidised human parathyroid hormone (PTH) peptides.

Another aspect of the disclosure provides microcapsules as obtained above for immunological pre-treatment of a biological liquid, which microcapsules comprise:

a sorbent core composed of antibodies and 0.3 to 2,5% (w/v) alginic acid in an aqueous antibody binding buffer which core has a volume from 0.1 to 50 microliters and a diameter from 0.5 to 5.0 mm and surrounded by a multilayer permeable to proteins no greater than 100 kDa made of alternatingly arranged layers of oppositely-charged liquid polymers in an aqueous environment, wherein the chosen polycationic polymers are selected from the group comprising linear or branched polyethylenimine, polyallylamine or polyvinyl amine having an average molecular weight Mn of about 100.000 to 2.000.000 Daltons, and the polyanionic polymers are selected from the group comprising pectin (poly-D-galacturonic acid methyl ester) having a molecular weight Mn from about 20.000 to 200.000 Daltons, polyacrylic acid having a molecular weight Mn from about 10.000 to 350.000 Daltons, carboxymethylcellulose having a molecular weight Mn from about 80.000 to 1.000.000 Daltons.

According to preferred embodiments, the alternatingly arranged double layers of polycationic and polyanionic polymers are facultatively separated by intermediate layers and/or coated by a most external layer comprising a polyglycan selected from the group comprising polyaminosaccharides, chitosan, alginate, glycosaminoglycan, hyaluronic acid.

According to preferred embodiments, said one or more polycationic layers comprise highly branched polyethylenimine have an average molecular weight Mn of about 500.000 to 2.000.000 Daltons.

According to preferred particular embodiments, the sorbent cores contain antibodies specifically binding oxidised human parathyroid hormone (PTH) peptides.

Another aspect of the disclosure pertains to the use of a sorbent material or microcapsules as described and claimed for pre-analytically treating plasma or serum in an automated test system for a removal of components interfering with a quantitative measurement of an analyte. In a preferred embodiment, the analyte is non-oxidised human parathyroid hormone (PTH).

The instant disclosure provides methods and sorbent materials developed for a pre-analytical preparation and treatment of serum or plasma samples which are to be assessed for their content of non-oxidised PTHs since preparations based on column chromatography cannot be readily integrated in standard automated procedures for a two-site immunoassay. Antibody-coated beads are no option for an automated pre-analytical preparation of plasma or serum samples since they require washing steps to overcome an unspecific binding of proteins. While magnetic bead-based analyte capture has become a ubiquitous method in clinical chemistry, enabling a highly specific capture of the target analyte through simple magnetic manipulation, they are likewise not useful for a removal of interfering components. Ultimately, the ideal sorbent material is one that not only facilitates a removal of components but also proves being selective and compatible with the wide range of downstream applications and analytic endpoints. The present disclosure provides a distinct sorbent material and microcapsules, as well as a method of obtaining the same, which specific advantages facilitate analytical goals. The microcapsules can be easily integrated into analytical applications that are not available for antibody-coated beads. It was discovered that lyophilized microcapsules consisting of a dried alginate matrix, the dried salts of an antibody binding buffer and antibody if surrounded by double-layers of macroion-rich polymers, provide conditions for a specific antibody-antigen reaction which does not require any further washing steps for being highly specific and selective. Without wishing to be bound by any theory, we believe that the specificity and selectivity of the antibody-antigen reaction comes from the reduced degree of mobility and motility of proteins within the alginate matrix as well as from the full or partial exclusion of other high molecular weight components present in serum or plasma. The proportion of high molecular weight proteins comprises the globulins, fibrinogen, lipoproteins, transferrin, plasminogen, macroglobulin, haptoglobin, thrombin, albumin. While it was known to perform enzymatic reactions on the surface and within microcapsules, the instant application discloses a specific and selective immunological reaction within alginate cores in combination with a partial pre-purification of the sample by a selective filtration through a semipermeable double membrane which takes away the need of washing steps for a specific immune reaction. The purifying immune reaction can therefore be easily integrated in an automated procedure.

The disclosure further allows for easy adaption of the method on automated systems since there are multiple methods available for an automated separation of large particles from a biological liquid, e.g. by filtration through a sieve. As the number of microcapsules added can be easily counted, taking away a pipetting step, the added amounts of antibodies can be "more strictly" controlled which reduces intra-assay variations.

The above and other characteristics, features and advantages provided by the present application will become apparent from the detailed description and the accompanying drawings, which illustrate, by way of example, the principles of the invention. This description is given for the sake of example only and shall not limit the gist of the invention, which can also be derived from the attached claims.

DETAILED DESCRIPTION OF THE INVENTION

Figure 1A:
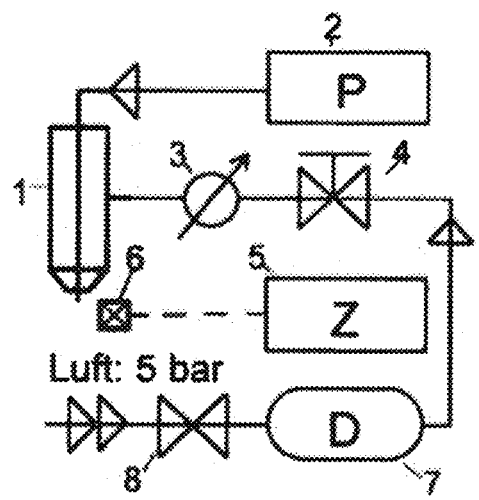
FIG. 1A, B a schematic representation of the device and nozzle for preparing homogenously sized alginate droplets.

The instant application provides a method for a pre-analytical treatment of serum or plasma samples, because the presence of oxidised PTH (oxPTH) peptides in plasma and serum interferes with the assessment of the effective level of biologically active PTH. The disclosure is however not limited to this specific application, say a depletion of serum samples from oxidised PTH peptides. Although no activity can be ascribed to oxidised PTH peptides, recent research suggests that there is a need to differentiate between the levels of oxidised and non-oxidised PTH in serum. Currently, the clinical measurements of "bioactive" PTH peptides in serum or plasma lead to a wrong medication, regardless of the type or "generation" of PTH measurement used. Thus, there is a need to remove from determination the inactive PTH peptides which got partially oxidised in vivo. Currently, numerous patients are wrongly diagnosed of suffering from secondary hyperparathyroidism and medicated accordingly (to further reduce the level of circulating PTH) while are already suffering from (too) low levels of physiologically active PTH.

This may contribute to the annual mortality of about 10 to 20% in patients with chronic kidney disease stage 5 (Melamed ML. et al, *Third-generation parathyroid hormone assays and all-cause mortality in incident dialysis patients: the CHOiCE study*, Nephrol Dial Transplant, 2008; 23(5): 1650-8). It has been speculated that the oxidised PTH possibly is a uremic toxin with systemic effects that lead to bone disorders (renal osteodystrophy), myopathy, neurologic abnormalities, anaemia, pruritus, and cardiomyopathy. Hyperparathyroidism is very often diagnosed in CKD patients and there can be no doubt that too low and too high PTH levels in patients on haemodialysis are associated with cardiovascular diseases, morbidity and increased all-cause mortality (Floege J. et ai, ARO investigators. *Serum iPTH, calcium and phosphate, and the risk of mortality in a European haemodialysis population*. Nephrol Dial Transplant. 2011; 26:1948-1955; Torres P A et al, Calcium-sensing receptor, calcimimetics, and cardiovascular calcifications in chronic kidney disease. Kidney Int. 2012; 82:19-25: Souberbielle J C et al. in Parathyroid hormone measurement in CKD. Kidney Int. 2010:77:93-100).

The Kidney Disease Outcomes Quality Initiative (KDOQI) guidelines recommend measuring PTH concentrations of patients with chronic kidney disease (CKD) and adjusting the patients' medication (e.g. vitamin D, phosphate binders, calcimimetics) such that plasma PTH levels are kept within a target range in accordance with the stage of CKD (e.g., 150 to 300 ng/L in patients with CKD stage 5). The PTH measurements are however pointless, if a combined level of oxidised and non-oxidised PTH is measured and not the level of circulating non-oxidised PTH (n-oxPTH). If a patient is suffering from chronic kidney disease (CKD), the redox balance may often be inclined in favour of an excessive production of reactive oxygen species and free radicals (oxidative stress). The oxidation of molecules then becomes relevant, in particular, when the patient is on dialysis. The sample of serum or plasma from that patient may then contain a substantive amount of oxidised and biologically false PTH which will be measured as "active PTH".

In practise, an automated procedure is needed in view of the high number of samples and probes. No automated removal of inactive PTH from the sample is currently available. In a preferred embodiment, the plasma or serum samples are treated pre-analytically by contacting them with sorbent microcapsules comprising antibodies against oxPTH and subsequently removed with said microcapsules so that the sample is depleted from inactive PTH. The present disclosure does not refer to the measurement of the PTH level in plasma or serum itself but to a pre-analytical sample preparation. The pre-analytical sample preparation also provides indirectly for a determination of the content of oxidised PTH in said sample, if a step of liquifying said microspheres is added. The released oxidised PTH can then be determined by conventional methods. A reliquifying of the calcium alginate can be obtained by a removal of the multivalent cations, e.g. by an addition of EDTA or EGTA or citrate. The primary method however is the preparation of serum or plasma samples depleted of oxidised PTH. The sample free from oxidised PTH peptides may then be subjected to a conventional PTH assay which may be an electrochemiluminescence immunoassay or enzyme-linked immunosorbent assay, RIA and/or an assay using tandem mass spectrometry as described in the prior art.

The instant method for pre-analytical sample preparation comprises a contacting of plasma or serum with one or more microcapsules which consist of a gelled hydrocolloid microsphere surrounded by semi-permeable multilayers or coatings. The microspheres of gelled alginate further contain dispersed or dissolved receptors (antibodies), which are in a preferred embodiment specific for oxidised PTH. The semi-permeable multilayers or membranes contain no receptors (antibodies), neither embedded nor the outside so that the immune reaction is specific for molecules that have passed the membrane and which permeated into the core microsphere, say molecules and proteins having less than 100 kDa. A substantive portion of the plasma and serum proteins can therefore be excluded from the immune reaction which takes away the need of washing steps for making the immune reaction specific. Conventional antibody-coated spheres or beads as used in immunocolumns require washing steps. This also applies to magnetic beads. Antibody-coated beads or spheres can further not be easily integrated in conventional machines for immunoassay.

The present application also contemplates a liquifying of said alginate cores within hardened semi-permeable membranes so that said receptors are finally in solution for an accelerated binding. Such an embodiment may provide an optimized antibody-antigen binding in an automated procedure. The receptors may be recombinant antibodies or single chain antibodies coupled to a large carrier protein.

Said semi-permeable multilayer coating or membrane may be adjusted to allow a transit of molecules having molecular weights less than 50 kDa, preferably less than 30 kDa. The upper cut-off for a passage of proteins through the membrane may be adjusted as necessary with an upper cut-off of 100 kDa so that immunoglobulins cannot pass the double membrane. A 50% permeability at 50 kDa usually results in a total impermeability for proteins larger than 100 kDa. A 50% permeability at 50 kDa typically reduces unspecific binding within the antibody compartment by more than 95% (w/w) with respect to the total protein in plasma or serum. In other words, predominant serum and plasma proteins such as albumin, fibrinogens, large globulins, haptoglobin, ceruloplasmin, macroglobulin become excluded from the immune reaction.

One aspect of the invention are therefore microcapsules comprising a gelled microsphere of a hydrocolloid or alginate which microsphere is coated by semi-permeable membrane or layers of oppositely-charged polymers. Said double-layered coating or membrane can be designed to allow passing of proteins having molecular weights less than 50 kDa, preferably 30 kDa to 1 kDa. In one embodiment, the coating may allow passage of molecules having molecular weights from 40 kDa to 1 KDa, preferably from 30 kDa to 2 kDa, most preferably from 20 kDa to 5 KDa. In another embodiment, the coating may comprise a polycationic layer in contact with said core microsphere; one or more oppositely charged supporting layers; and a polyanionic external layer. In a further embodiment, the innermost layer may comprise polycations selected from basic poly-amino acids, poly-lysine, poly-L-lysine, polyethylenimine, chitosan, deacetylated chitin, and combinations thereof. Preferred embodiments are microcapsules having a first polycationic layer around said gelled mAb-alginate microsphere, followed by one or more alternatingly arranged layers of oppositely charged macroions; and an outmost an external polyanionic layer for a negative surface potential so that the microcapsules will not adhere at each other.

Said hydrocolloid microsphere may comprise alginate, sodium alginate, polysaccharides, polysaccharide gums, carboxymethylcellulose, xanthan, guar and combinations thereof. In a preferred embodiment, said core microsphere or core compartment may contain buffer salts, preferably an isotonic binding buffer, as well as dispersed or dissolved receptor molecules or antibodies, e.g. specifically binding oxidised PTH molecules, as well as multivalent salts. The isotonic buffer may be needed to avoid undesired osmotic effects when the membrane-coated spheres (microcapsules) are added to isotonic plasma or serum samples. As mentioned, said receptor molecules may be antibodies recognizing an epitope of oxidised PTH. It is contemplated to use conventional or full-size antibodies, or when unconventional antibody receptors are used, to have those coupled or coupled to a carrier so that they remain entrapped in the core compartment. Unconventional antibody fragments may be obtained chemically (Fab, Fab', (Fab')2, and Fv fragments) or by genetic engineering or as single chain variable fragments (scFv, diabody, triabody, tetrabody, Bis-scFv, minibody, Fab2, Fab3).

Another aspect provides a method of preparing microcapsule comprising the steps:—a) preparing an alginate solution in buffer with receptor molecules, preferably monoclonal antibodies specific for oxidised PTH; b) producing homogenously sized droplets of said mixture of sodium alginate solution and receptor molecules; c) contacting said droplets with a solution of multivalent cations, e.g. divalent $Ca^{2+}$ or $Ba^{2+}$ to obtain gelling of said alginate droplets; and d) coating said gelled alginate droplets alternatingly with layers of oppositely-charged macroions, e.g. polyethylenimine and polyacrylate. The layer-by-layer membranes may consist of a sequence of alternating cationic and anionic macroion-rich phases, the alternating phases having been applied by electrostatic layer-by-layer adsorption. The permeability of such double layers depends on the macroions used, the coacervation and the preferred final lyophilisation by which pores may be reintroduced into said double membrane. The multi-bipolar structure of the double-layered macroion-rich membranes favours an exclusion of larger proteinaceous molecules. Various effects on the rate of permeation and the selectivity were investigated but numerous factors are influencing pore size and permeability. Addition of swellable macroions during membrane deposition generally leads to increased permeability and pore size while the use of branched cations with a high charge density had the opposite effect. Use of macroions with high charge density generally improves separation. Very good results were obtained with double membranes comprising polyallylamine (PAH) or polyethylenimine as cationic macroion.

In a preferred embodiment of the method, a solution of alginate and receptor in binding buffer is injected in a nozzle through a small orifice, the orifice being surrounded by a concentric flow of air or gas, preferably nitrogen or argon, so that homogenous droplets become abstracted from the orifice, torn off and be blown into a bath with a multivalent ion. The droplet size can be made very homogenous by the amount and intensity (speed) of the concentric gas flow. For homogenous droplet size it is sufficient to control the injected gas stream and the flow of the alginate mix through the orifice which is easy to do. In other words, the volume of the core microspheres can be controlled more precisely than any pipetting step, which is suffering from surface effects, and therefore the amounts added to the sample can be controlled by simply counting the number of microcapsules added. The principles of the device for preparing homogenous droplets is shown in FIGS. 1A and B.

The microspheres with the antibodies are then washed, provided with a first cationic layer and thereafter alternatingly with layers of oppositely charged macroions, preferably macroionic branched polymers with high surface charge density. The outmost external layer will be an anionic polymer to have a negative surface potential. The coated microspheres are preferably lyophilized for adjusting and ripening of the double membrane as well as for a determined pore size and permeability.

The present disclosure further provides an advantageous removal of interfering components from a sample. Different to methods using covalently immobilized antibodies the aqueous hydrocolloid contains said receptors or antibodies in some kind of accessible state or in dispersion and the immune reaction can take place under defined conditions. The microcapsule therefore offers reduced unspecific binding as compared to other support materials such as sepharose beads. With the disclosed microcapsule only molecules of a defined size fraction can permeate into the microcapsule and interact with the antibodies. Therefore, unspecific binding is considerably reduced. The production of alginate microcapsules containing antibodies is inexpensive and can be performed under mild non-denaturing conditions with little loss in material.

Usually, microencapsulation refers to a process of enclosing particles of solids or droplets in a shell. Commonly, microcapsules are used for a release of substances of interest or for isolation of compounds within a given environment. U.S. Pat. No. 4,352,883 discloses an encapsulation of cells which are in suspension in an aqueous medium. Droplets thereof are gelled by contacting with a solution of multivalent cations. A water insoluble surface layer is then formed by cross-linking to produce a membrane around the core. A liquifying by a removal of said multivalent cations is also described. However, the conventional microcapsules are designed for an encapsulation of living cells, in vivo implantation and/or a release of clinically relevant molecules.

Microencapsulation of antibodies in a semipermeable nylon membrane for a radioimmunoassay of digoxin in serum has been described by Halpern and Bordens "*Microencapsulated antibodies in radioimmunoassay-1. Determination of digoxin*", Clin. Chem. 25/6, 860-862 (1979). Immobilization of enzymes in alginate-chitosan microcapsules is disclosed in Taaieddin and Amiji "*Enzyme immobilization in novel alginate-chitosan core-shell microcapsules*", Biomaterials. 2004 May; 25(10):1937-45. Further, Chen et al, "*Microfluidic one-step synthesis of alginate microspheres immobilized with antibodies*" J R Soc Interface 2013 Aug. 21;10(88):20130566 describe alginate microbeads coated with antibodies against bacterial proteins. None of these conventional approaches is suited for a pre-analytical treatment of serum or plasma samples and none of the prior art documents suggests a the combination of a molecular sieve with a specific immune reaction.

There are further reports suggesting alginate can be associated with an inhibition of lipid peroxidation and in vivo stimulation of antioxidant activity mechanisms (Khotimchenko et al, "*Healing and Preventive Effects of Calcium Alginate on Carbon Tetrachloride Induced Liver Injury in Rats*" Mar. Drugs 2004, 2, 108-122). However, there has been no report on antioxidant activity of alginate in serum or plasma samples nor have we observed any antioxidant activity in relation to oxidised PTH peptides in vitro. Without wishing to be bound by theory, the alginate polymer in the microcapsules may inhibit oxidative mechanisms after sample collection. On-going oxidative mechanisms in vitro would falsely reduce the amount of biologically active PTH in the sample. A distortion of the correlation between the oxPTH content in the sample and the actual oxPTH concentration in the patient would be the result. Thus, the alginate may have particular beneficial effects when it comes to the measurement of non-oxidised PTH in a clinical sample. This may be needed because transition metals such as Fe, which is abundant in the plasma or serum sample, may catalyse lipid and protein oxidation. The antioxidant activity of alginate may be attributable to its metal chelating, free radical scavenging and ferric ion reducing abilities. Thus, the use of alginate in the pre-analytical treatment of plasma or serum samples may be advantageous to prevent in vitro oxidation of PTH. It is therefore contemplated to have lyophilized mAb-alginate microcapsules already present in the blood collection tube. The use of mAb-alginate microcapsules would combine the sample pre-treatment with a prevention of an in vitro oxidation of PTH peptides, thereby increasing the reliability and accuracy of the PTH measurements.

Figure 2:
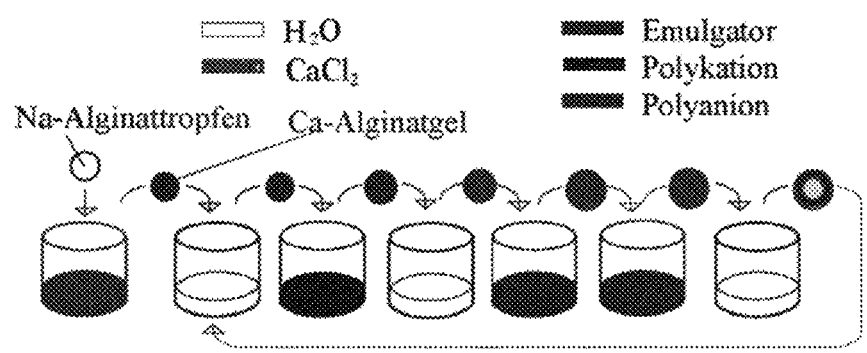
FIG. 2 is a schematic representation of the process steps for a layer-by-layer deposition of a semi-permeable multilayer by coacervation of oppositely charged macroion-rich phases.

According to the invention, the molecular sieve is obtained by adsorbing alternatingly polycationic and polyanionic macroions onto a hydrocolloid sphere, e.g. a gelled alginate sphere. Operationally, this method involves consecutive exposures of starting spheres to liquid polycations and polyanions, with rinsing steps in-between to remove non-adsorbed polymer after each deposition; see FIG. 2. Typical polyanions employed for deposition of these layers include ionized forms of poly(acrylic acid) (PAA), poly(styrene sulfonic acid) (PSS), and poly(vinyl sulfonic acid), whereas as polycation a branched polyethylenimine of high molecular weight gave good results. The layer-by-layer adsorption has a number of advantages. First, this technique offers control over thickness at the nanometre scale because a single adsorption step can deposit as little as a few angstroms (Å) of polymer. Second, conformal adsorption occurs on substrates with a wide range of geometries. Finally, the range of ionic materials suitable for adsorption and the ability to deposit species in a defined order affords a wide variety of functional adjustments. However, the steps must be closed controlled since the polyionic phases may intertwine themselves over several layers. Postdeposition reactions such as cross-linking and coacervation as well as lyophilization can provide further ways to modify the sieve properties of the surrounding multilayers.

The key feature in the deposition of macroionic multilayers is charge overcompensation. The initial cationic layer adsorbed onto the hydrocolloid by electrostatic and Van-der Waals interactions creates a charged surface. Adsorption of subsequent layers overcompensate the charge on the surface to reverse the substrate's charge and allow adsorption of the next layer. Depending on the macroion it may be necessary to include an emulgator step or washing step to adjust the surface charge. In many cases, the thickness of multi-layered macroionic films increases linearly with the number of adsorbed layers. This suggests that the extent of charge overcompensation does not vary greatly with the number of adsorbed layers, so the amount of macroionic phase deposited in each step is approximately constant. However, for some systems film thickness increases exponentially with the number of layers. This may the case when one of the macroions diffuses "into" the other layers during deposition. Upon addition of the oppositely charged polyelectrolyte, the previously adsorbed macroions may then diffuse "out" to form a very thick polyanion-polycation complex at the surface. Consequently, it is essential to control precisely the layer-by-layer deposition to obtain the desired molecular sieve properties after hardening and lyophilisation.

In addition to the polycation and polyanion selected for deposition, parameters such as concentration, pH, adsorption time, and temperature influence the amount of macroion deposited. In the absence of added salt, macroions are highly extended to maximize the distance between the charged repeat units of the polymer. Under these conditions, adsorbed layers are thin and overcompensate the surface charge only slightly. It may be favourable to deposit the macroions with high charge density from solutions containing up to 2 M salt as this increases the thickness of the layers.

A wide range of structural variation is available for layer-by-layer depositions. Chitosan/hyaluronic acid films can for example swell and are known to be permeable to large molecules whereas polyallylamine/polyacrylic acid coatings can be impermeable to even glucose. In general, layer-by-layer films prepared from macroions with a high charge density have a high degree of ionic cross-linking which is needed for decreased permeability and high molecular selectivity. The latter works only when the microcapsules have not been hardened by lyophilisation. The described deposition is convenient and versatile, and the application and synthesis can easily be automated since the treated microspheres can be recovered by filtration.

The method of the disclosure provides microcapsules comprising a gelled alginate sphere surrounded by a type of layer-by-layer membrane with pores of defined uniform size. The layer-by-layer membrane can further be hardened so that the alginate core of the microcapsules can be allowed to liquify again, e.g. when in an EDTA-treated serum or plasma sample. In other words, the receptors or antibodies will then be free in solution within the core compartment but only molecules below a defined size and molecular weight (MW) can pass the hardened semipermeable membrane around the core compartment.

The instant disclosure relates to a microcapsule having a core sphere comprising a polyanionic gelled hydrocolloid. Suitable polyanions may be selected from alginate, sodium alginate, polysaccharides, polysaccharide gums, carboxymethylcellulose, xanthan, guar and combinations thereof. The core sphere may comprise receptor molecules, notably antibodies specific for binding to oxidised parathyroid hormone (oxPTH) Without wishing to be bound by theory, setting the pH of the alginate core close to the isoelectric point of the immunoglobulin or receptor, this may lead to a reduced adsorption onto the polyanionic polymer. In addition, increasing the ionic strength of the solution, for example to 100-150 mM, may further reduce adsorption. Thus, conditions may be directed to maintain a larger population of immunoglobulins in solution, thereby facilitating the immunological interaction between the antibodies and the target antigen, e.g. oxidised PTH peptides.

The isoelectric point of PTH is between 7.3 and 8. Therefore, PTH may have a neutral or slightly positive charge at pH 7. Without wishing to be bound by theory, oxPTH molecules seem to permeate into the core sphere where electrostatic interactions with anionic groups occur. Thus, oxPTH peptides may tend to become concentrated in the alginate core thereby facilitating the interaction with the antibodies. There is however no binding competition since the antibody reaction is likely stronger than any electrostatic interaction.

The following examples are provided to further illustrate the embodiments of the present disclosure but are not intended to be limiting. While they are typical of those that might be used, other procedures, methodologies or techniques known to those skilled in the art may alternatively be used.

EXAMPLES

Example 1 Preanalytical Treatment of Samples Containing oxPTH (Proof of Principles)

A pre-analytical treatment was tested on (i) a sample buffer spiked with synthetic human PTH(1-84) which is known to contain oxidised PTH molecules, (ii) plasma from a uremic patient suspected suffering from oxidative stress (OX), and (iii) plasma from a healthy subject likely not suffering from oxidative stress (NOX), and (iv) pure sample buffer (Tris-casein, pH 7) as control. For comparative purposes, the samples were contacted with sepharose beads with immobilized antibodies against oxPTH peptides (mAb-sepharose). The same monoclonal rat antibody (ID3B) was used in the comparative experiment. The antibody was a proprietary rat monoclonal antibody (Immundiagnostik AG, Bensheim: A1112) against oxidised peptides of hPTH (oxPTH).

PTH concentrations (pg PTH/mL sample) were measured prior (+) and after pre-treatment (−) using a standard electrochemiluminescence immunoassay (Elecsys™2010 PTH immunoassay of Roche Diagnostics GmbH, Mannheim, Germany). The Elecsys™ assay employs a sandwich test principle in which a biotinylated monoclonal antibody reacts with the N-terminal fragment (1-37) and a monoclonal antibody labeled with a ruthenium complex reacts with the C terminal fragment (38-84). The PTH value determined after pre-treatment, measured by said standard electrochemiluminescence immunoassay, is referred herein as n-oxPTH.

5, 10 or 50 microcapsules (volume 2 μL) with anti-oxPTH antibody were added to each sample (×5, ×10, ×50 microcapsules). The microcapsules were prepared as described in the example below. As control, 50 microcapsules with alginate only were added to each sample. The cut-off size of the semipermeable membrane or molecular sieve around said microcapsules was not determined but likely around 100 kDa since the antibodies confined in the alginate core could not pass, say leave the microcapsules.

In brief, 500 μL sample i) 1.5 μg synthetic hPTH(1-84) from Bachem AG, Switzerland (pTH(1-84) trifluoroacetate salt Cat-No. 1065881) in 10 mM Tris/NaCl buffer, pH 7.4, ii) plasma from a healthy individual, and iii) plasma from a uremic patient were incubated with 5, 10 alginate microcapsules with anti-oxPTH antibodies as described or no antibody as control under gentle shaking at room temperature for 1 hour. The liquid samples were then separated from the alginate microspheres by filtration. The filtrate was collected and its PTH content determined.

For comparison, the anti-oxPTH-antibodies were immobilized on CNBr-activated Sepharose 4B (GE Healthcare Bio-Sciences, Uppsala, Sweden) according to the manufacturer (2 mg anti-oxPTH antibody/mL sepharose slurry). 50 μL mAb-sepharose slurry was placed in a test tube (MobiSpinColumn, MoBiTec, Göttingen, Germany) and equilibrated in PBS buffer, pH 7.4. 500 μL sample solution or plasma was applied onto the column and after mixing incubated at room temperature for 1 hour. The slurry was gently centrifuged, and the supernatant collected for PTH analysis. Results are shown in Table 1 and FIGS. 3-4.

TABLE 1

| Pre-analytical Treatment | synthetic PTH | Plasma (OX) | Plasma (NOX) | Buffer |
|---|---|---|---|---|
| — | 1439.8 | 144.7 | 96.7 | 3.7 |
| mAb-sepharose | 21.2 | 22.9 | 23.1 | 1.5 |
| ×5 mAb-alginate | 93.2 | 88.7 | 90.3 | — |
| ×10 mAb-alginate | 44.8 | 78.6 | 88.7 | — |
| ×50 mAb-alginate | 27.6 | 25.5 | 10.4 | 3.4 |
| ×50 alginate | 1430.8 | 153.5 | 102.8 | 2.7 |

PTH [pg/mL]

The results confirm that the pre-analytical treatment with mAb-microcapsules effectively disburdened the samples from inactive oxidised PTH. On the other hand, mAb-sepharose beads resulted in similar PTH concentration measurements prior and after pre-treatment and independently from the sample tested. This was due to the unspecific binding on mAb-sepharose beads. The antibody-sepharose beads therefore proved not suitable for a one-step pre-analytical treatment. An unspecific binding was not observed with microcapsules where the immune reaction was preceded by a selective separation through a molecular sieve or semi-permeable membrane.

The results also show that the effect of the mAb-microcapsule pre-treatment depended on the number of microcapsules added. In the given examples, five microcapsules absorbed approximately 1.3 µg synthetic PTH, which confirmed that most PTH peptides in said synthetic PTH preparation had got oxidised during synthesis. Unspecific effects or binding by alginate microcapsules was only observed with an excess of 50 mAb-microcapsules or more. Alginate microsphere without antibody behaved neutral and showed no harmful effects.

Table 2 shows the relative concentrations of non-oxidised PTH (n-oxPTH) in the assayed samples after pre-treatment with 5 and 10 microcapsules. PTH concentrations were measured using the Elecsys™PTH immunoassay of Roche Diagnostics GmbH, Mannheim, Germany, on a Roche modular E 170.

TABLE 2

| Pre-analytical Treatment | synthetic PTH | Plasma (OX) | Plasma (NOX) |
|---|---|---|---|
| ×5 mAb-alginate | 6.5 | 61.3 | 93.4 |
| ×10 mAb-alginate | 3.1 | 54.3 | 91.7 | n-oxPTH [%]

The results show that plasma samples of healthy individuals contained between 6.6-8.3% oxidised PTH molecules. The proportion of oxidised PTH in plasma of a uremic patient was 38.7-45.7% and six times higher.

Figure 3:
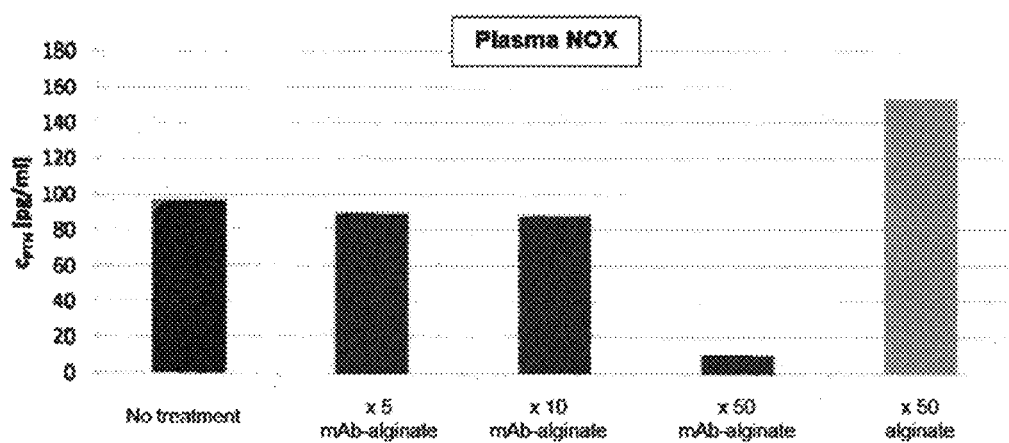
FIG. 3 is a diagram showing the concentrations of non-oxidised PTH in a sample from a healthy individual (NOX) after various pretreatments to remove oxidised PTH peptides.

FIG. 3 shows in a diagram the results with plasma samples (Plasma NOX) from a healthy individual. Pre-treatment with 5 or 10 mAb-alginate microcapsules changed the total PTH content prior and after pre-treatment only marginally. The results are consistent with the observation that healthy individuals do not suffer from oxidative stress and that the circulating PTH does not become oxidised in vivo.

Figure 4:
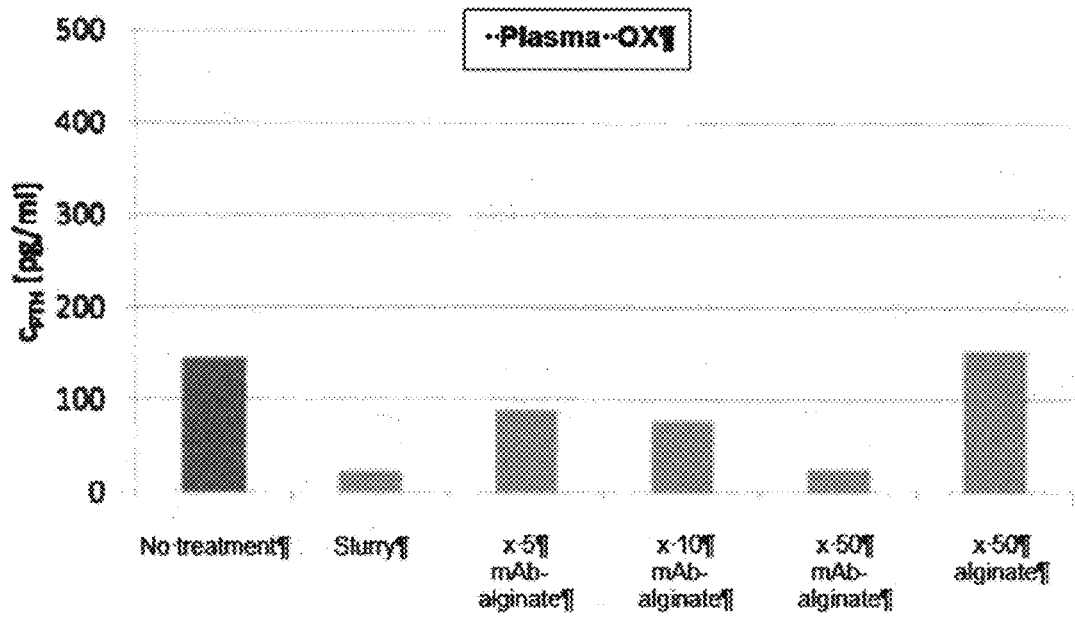
FIG. 4 is a diagram showing the concentrations of non-oxidised PTH in sample from a patient subject to oxidative stress (OX) after various pretreatments to remove oxidised PTH peptides.

FIG. 4 shows the results of the same experiment but obtained with a plasma sample (Plasma OX) from a uremic patient who suffered from oxidative stress and inflammations. A pre-treatment of the plasma as described reduced the effective PTH content by about 30 to 50 percent. While the PTH level (without pre-treatment) in plasma of said uremic patient was elevated compared to that of a healthy subject, both plasmas contained similar levels of biologically effective PTH (non-oxidised PTH).

Figure 5:
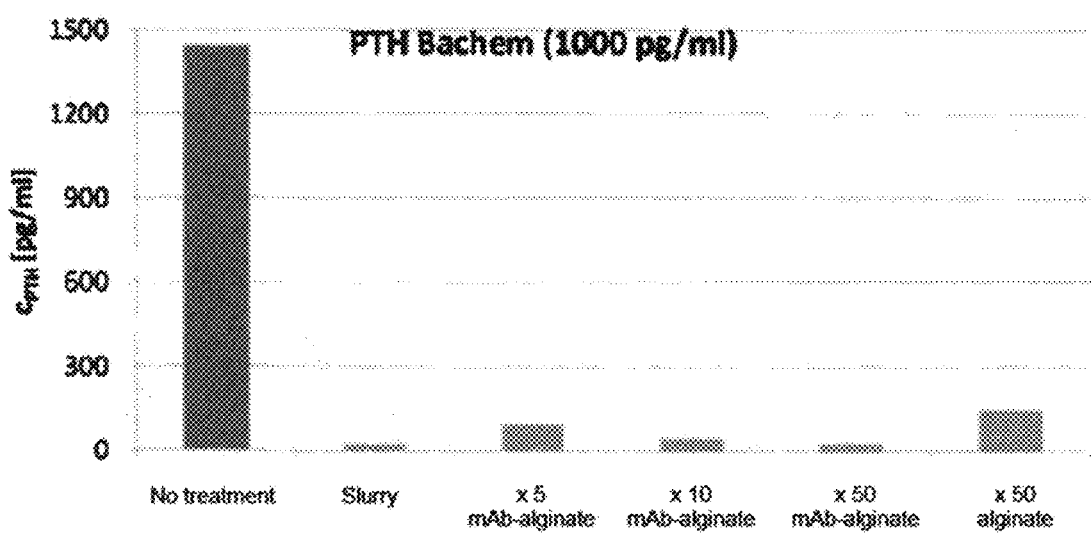
FIG. 5 is a diagram showing the concentration of non-oxidised PTH in commercially available synthetic PTH (Bachem) after different pretreatments.

FIG. 5 shows in a diagram the results obtained with a sample spiked with 1.5 µg synthetic hPTH(1-84) from Bachem (pTH(1-84) trifluoroacetate salt Cat-No. 1065881) in 10 mM Tris/NaCl buffer. The sample was pre-treated with mAb-sepharose beads and membrane-coated alginate microspheres as described. The results show that the synthetic PTH consisted to large proportion of non-functional oxidised PTH and that the pre-treatment with microcapsules was effective to remove non-functional oxidised PTH peptides from said sample.

Example 2 Production of Monoclonal Antibodies (mAb) Against Oxidised PTH Peptides A peptide comprising the amino acid sequence 1 to 38 of human PTH (hPTH(1-38) was obtained from Immundiagnostik AG (Bensheim, Germany). 200 mg hPTH(1-38) were dissolved in 400 ml of 0.1 M acetic acid (final concentration 0.5 mg/ml), mixed 1:1 with 30% hydrogen peroxide and incubated for 45 min at 37° C. Afterwards, the mixture was cooled on ice, divided into aliquots and lyophilized to obtain oxidised PTH1-38 peptides (oxPTH1-38).

Monoclonal antibodies (mAb) were raised in BALB/c-mice. The mice were immunized by intraperitoneal injection with 200 µg oxPTH1-38 conjugated with thyroglobulin as described above. For both primary and secondary immunizations incomplete Freund's (mineral oil only) was used. Antisera were tested for binding to non-oxidised biotin-hPTH(1-38). To detect antibodies specifically recognizing oxidised PTH1-38 peptides, double antibody separation technique was used. As a tracer, biotin-oxPTH(aa1-38) was labelled with $^{125}$I-streptavidin. After cell fusion and HAT selection, selected hybridomas were screened for binding to human oxidised PTH(1-84) peptides but not to human PTH(1-84). The proprietary monoclonal antibody anti-oxPTH (Immundiagnostik AG, Bensheim—ID3B-180621) recognized a conformational epitope generally common to oxidised hPTH peptides.

The specificity of the monoclonal antibody (MAB) raised against oxPTH1-38 was further characterized as described by Hocher B et al, Measuring parathyroid hormone (PTH) in patients with oxidative stress—do we need a fourth generation parathyroid hormone assay?PLoS ONE 2012 (7), e40242. In brief, the antibody was immobilized on CNBr-activated Sepharose 4B {GE Healthcare Bio-Sciences, Uppsala, Sweden) and aliquots filled in a column (MobiSpinColumn, MoBiTec, Göttingen, Germany), equilibrated with PBS buffer, pH 7.4. Then 2.5 µg of lyophilized oxidised hPTH1-84 were dissolved in 300 microliters of equilibrating buffer and applied on the column. The column was incubated end-over-end for one hour at room temperature, washed and then eluted with elution buffer containing 0.1% trifluoroacetic acid. Flow-through, wash fractions (equilibrating buffer and water) as well as eluate of the column were collected separately, lyophilized and analyzed by nanoLC-ESI-FT-MS which showed that oxidised PTH peptides were found only in the eluate but not in the washing buffer.

Example 3 Production of mAb-Alginate Microspheres

Figure 1B:
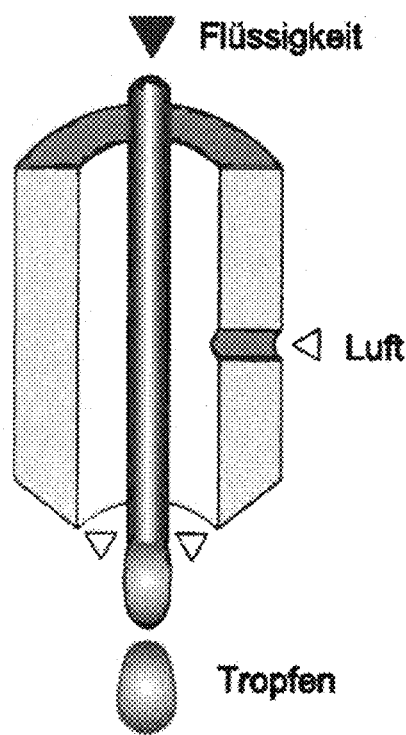

Sodium alginate (Inotech AG, Switzerland) solution was dissolved in deionized distilled water at 1% (w/v) and the mixture stirred at room temperature for 8 hours to ensure complete dissolution. The alginate solution was filtered and 800 μL 1% (w/v) alginate solution mixed with 200 μL anti-oxPTH mAb (2 mg/mL 10 mM Tris-buffer). Droplets were formed using a microfluidics system (see FIGS. 1 and 2) and dropped into 500 mL water bath containing 1,5% (w/v) $CaCl_2$. The size of the droplets was controlled by the needle gauge and an air atomizer. The alginate-mAb droplets were allowed to gel and crosslink in said gelling bath for 5 minutes; the resulting gelled microspheres were then washed in glycine buffer. The droplets and alginate microspheres had a preferred average volume size of about 2 μL (d=1,5-1,6 mm).

Example 4 Production of mAb-Alginate/Poly-L-Lysine Microcapsules

After gelling and crosslinking in $CaCl_2$, the washed polyanionic microspheres were collected, treated again with aqua dest and placed in a bath containing 400 mL 0.05% (w/v) poly-L-lysine 34 kDa (PLL, Sigma, St-Louis, MO, USA), 110 mM $CaCl_2$ for 30 min at room temperature. The primary hardening was followed by a washing with saline buffer (0.9% NaCl in 10 mM MOPS, Sigma, St-Louis, MO, USA) and an incubation in 500 mL 0.05% (w/v) sodium alginate for 10 min. The hardened microcapsules were washed with a solution containing 150 mM NaCl and 0.5 mM $CaCl_2$ and equilibrated in TBS buffer. The solid microspheres could be liquefied again by incubation in 0.05 M sodium citrate for 15 min.

Double-membrane coated microspheres (microcapsules) were produced by incubation with a highly branched polyethylenimine from Polyscience GmbH, Heidelberg, DE (Mw 2,000,000, 25% w/v aq. soln. with high cationic charge density, containing primary, secondary, and tertiary amine groups with pH 8) as cationic layer for 5 min at room temperature in 150 mM NaCl. The microcapsules were incubated for further 10 min in 500 mL 0.05% (w/v) sodium alginate for 10 min. The microcapsules were subsequently washed twice with TBS 1× buffer and kept in TBS 1× at 4° C. As anionic phase and electrolyte was used a polyacrylate (Polyscience Cat No. 18611-250) with a molecular weight of approx.15 kDa or 60 kDa for another 5 minutes at room temperature. The intermediate washing solution contained 1% Briji®35 (Sigma Aldrich which is a polyethylene glycol dodecyl ether (Mn~1,198) or 1% SDS. Six layer-by-layer depositions were applied with an alginate layer at the outside to provide a negative surface potential. The following combinations layers were tested.

TABLE 3

| Layers | Detergens | Lyophilisation |
| --- | --- | --- |
| No | SDS | – |
| PEI/PA15/PEI/PA60/PEI/ALG | SDS | – |
| No | SDS | – |
| No | SDS | + |
| PEI/PA15/PEI/PA60/PEI/ALG | SDS | + |
| No | SDS | + |
| PEI/PA15/PEI/PA60/PEI/ALG | SDS | + |
| PEI/PA15/PEI/PA60/PEI/ALG | SDS | – |
| PEI/PA15/PEI/PA60/PEI/ALG | SDS | + |
| PEI/PA15/PEI/PA60/PEI/ALG | Brij35 | – |
| PEI/PA15/PEI/PA60/PEI/ALG | Brij35 | + |

Example 4 Production of mAb-Alginate/Chitosan Microcapsules

The alginate microspheres were prepared as described in Example 3 but dispersed in 0.75% (w/v) chitosan in 0.1 M acetic acid solution for 5 minutes. The microcapsules were placed into 3.0% (w/v) sodium triphosphate (Na-TPP) aqueous solution and incubated in the Na-TPP solution for 90 minutes. The obtained microcapsules were stored in 1×TBS at 4° C. The phosphate ions of Na-TPP diffused into the core and extracted the $Ca^{2+}$ ions, resulting in a liquid core system. Na-TPP-crosslinked alginate microcapsules had a molecular weight cut-off of approximately 17.000 Da (17 KDa).

Example 5 Sorption of Oxidised PTH Peptides within mAb-Alginate Microcapsules

Synthetic human parathyroid hormone (Bachem, pTH(1-84) trifluoroacetate salt Cat-No. 1065881) was used as reference because it contains oxidised PTH peptides. A solution with synthetic hPTH (50 μg/mL) in 10 mM Tris, pH 7.4 was prepared and pre-treated with lyophilised and non-treated microcapsules (PEI/PA15/PEI/PA60/PEI/ALG, Brij35) of example 3. After standard pre-treatment, the proteins in the supernatant and within the microcapsules were examined by 4-20% SDS-PAGE (non-denaturing, SERVAGeI® TG PriME®) 4-20%, Cat No. 43289) and Western blotting. The results showed that dissolved microcapsules contained as expected PTH peptides as well as antibodies after pre-treatment. When the microcapsules were lyophilised, the supernatant of the microcapsules showed almost no detectable PTH band in the range of 9.5 kDa, whereas a clear band was visible in case of the dissolved microcapsule. This shows that the pre-treatment had the effect that almost all oxPTH peptides became internalized into the microcapsules. For non-lyophilised microcapsules, the results were no so clear—more PTH was in the supernatant—which confirmed that the lyophilisation had a substantive effect on the stability of the surrounding membrane and its pore size.

Example 6 Measurement of Biologically Effective PTH Using a Sandwich ELISA Employing Polyclonal Antibodies to Distant Regions on Full-Length PTH Peptide The first generation of PTH assays (RIAs) used just one antibody directed toward the midregion of the PTH sequence and detected mature PTH1-84 as wells as fragments thereof. The mature form of PTH1-84 (iPTH) is physiologically produced by a sequential cleavage of the initially translated prepro-PTH (115 amino acids) via pro-PTH (90 amino acids). Neither prepro-PTH nor pro-PTH are detectable in the circulation. It was then discovered that mature PTH1-84 has a short half-life in the circulation of less than about 5 minutes and is degraded to an N-terminal fragment PTH1-34 and C-terminal fragments PTH 39-84 which usually are more stable in the circulation. However, the human PTH exerts its effects through the interaction of its first N-terminal 34 amino acids with the PTH receptor. In blood, the ratio of N-terminal PTH1-34 to PTH1-84 is stably low except in case of a some tumors which excrete PTH1-34 or PTH1-38 The discovery of C-terminally truncated PTH fragments, particularly in patients with ESKD, and the knowledge that the physiologic activity of PTH is located within the N-terminal PTH1-34 region stimulated the development of a second generation of PTH assays: the so-called intact parathyroid hormone (iPTH) assays. These are two-site sandwich immunoassays, and they typically have a solid-phase capture antibody directed toward the C-terminal region of PTH (amino acids 26-32 or 39-84) and a detection antibody directed toward the N terminus (usually toward amino acids 12-24). This way of assay design increased the specify of the PTH assays because they avoided crossreactivity with C-terminal PTH fragments. A third generation of PTH assays was further developed, in which the detection antibody epitope was targeted further toward to amino acids 1-4 of the N-terminus but biological inactive fragments of the type PTH7-84 appear very speculative since they can not be detected in physiological samples. The solid-phase capture antibody directed toward the C-terminal region of PTH was the same as for second generation PTH assays. The clinical performance of second and third generation PTH assays are comparable, and both are currently used. However, both second and third generation PTH assays detect and determined oxidised PTH1-84 which is present in physiologically relevant amounts in the circulation.

Consequently, membrane-coated microspheres were tested for their capacity to take down and quarantine oxidised PTH peptide chains from a sample by encapsulation. This was determined by a measurement of iPTH1-84 in the resulting supernatant using a 2nd generation PTH assay based on polyclonal antibodies against the human PTH1-84 (Biomerica, Inc., Irvine, CA—Art.No. 7022). More precisely, the iPTH-ELISA comprised two goat polyclonal antibodies purified by affinity chromatography to be specific for distant regions on the intact human PTH molecule. The biotinylated polyclonal antibody did bind the midregion and C-terminal PTH39-84. The other polyclonal antibody was labeled with horseradish peroxidase for detection and directed against N-terminal PTH1-34. Only full length PTH1-84 peptides were therefore bound by both antibodies forming the sandwich complex necessary for detection. This $2^{nd}$ generation polyclonal iPTH ELISA assay can therefore be considered representative for all commercially available $2^{nd}$ and $3^{rd}$ generation immunoassays for "intact" or "whole PTH" (iPTH or wPTH). Moreover, polyclonal antibodies preferably bind to the primary peptide structure and are less sensitive to folding and masking effects. The polyclonal iPTH ELISA can therefore determine full-length oxidised PTH chains even in the presence of a third antibody against oxidised PTH if the non-functional oxidised PTH peptide chains are not removed from the sample. In CKD, both pathways of PTH degradation in the kidney are progressively impaired. This leads no only to a prolongation of the $t_{1/2}$ of C-terminal PTH fragments in the circulation and also to an increased fraction of inactivated oxidised PTH through oxidative stress and inflammatory reactions producing oxidative radicals (Couchman L, et al., *LC-MS candidate reference methods for the harmonisation of parathyroid hormone (PTH) measurement: A review of recent developments and future considerations* (2014) Clin Chem Lab Med. 52(9):1251-63; Cavalier E et al., Considerations in parathyroid hormone testing (2015) Clin Chem Lab Med. 53(12):1913-9.).

In this experiment, oxidised PTH peptides in the sample were removed using either spin colums with a characterized monoclonal antibody against oxPTH1-38 on sephadex G (Immundiagnostik AG, Art. No. K1548, Bensheim, DE). The anti-oxPTH affinity colmues, equilibrated in PBS at pH 7.4, were opened and centrifuged to dryness at 3000 g for 30 seconds. 300 µl plasma sample were added to the column and incubated mixing end-over-end for 1 h at room temperature. The columns were placed on an 1.5 ml Eppendorf tube and again centrifuged at 3000 g for 60 seconds to collect the treated sample, typically about 250 µl volumee. The iPTH concentration was measured in aliquots of treated samples (containing non-oxidised PTH only) and non-treated samples (containing oxidised and non-oxidised PTH). The iPTH measurements in treated samples from CKD patients and healthy controls (n=135) showed no significant difference. The anti-oxPTH affinity material had a higher binding capacity while the removal of oxPTH by membrane-coated microcapsules was dependent on the number of spheres added to the sample and required more antibody material.

Example 7 Membrane-Coated mAb-Alginate Microspheres with Various Filler Materials In order to improve the physical stability of the alginate spheres and thus their manageability, various fillers were investigated as a 10 percent additive (approx. 1 g/ml) to the alginate solution. The following additives were tested: maize starch, kaolin, mannitol, sucrose, glycine and polyethylene glycol (PEG). The membrane-coated microspheres or microcapsules were prepared as described in example 4. It was further tested whether the additives in the mAb-loaded alginate cores of the micro-capsules have an influence on the n-oxPTH values measured in the flow through or sample supernatant. For this purpose, 20 spheres of each production batch were examined. Mannitol, sucrose and glycine as fillers brought little or no improvement in the stability and surface properties of the spheres. The addition of PEG or kaolin caused a disadvantageous agglomeration of the spheres. Stability and manageability were improved however when maize starch was added to the alginate cores compared to spheres without filler. The results have been summarized in Table 4.

TABLE 4

| Filler | Separability | Handling Manageability | Phys. Stability | Impact on measured n-oxPTH values |
|---|---|---|---|---|
| Maize starch | + | ++ | + | 0 |
| Kaolin | − | + | + | − |
| Mannitol | 0 | 0 | + | 0 |
| Saccharose | 0 | − | − | + |
| Glycine | 0 | − | − | + |
| PEG | − | + | + | − |

Characteristics: ++: much improved; +: improved; 0: not changed; −: worsened.

Further tests showed that the addition of 0.05 g/ml maize starch to the alginate was sufficient to obtain optimal physical stability and handling of the spheres and had no impact at all on the adsorption of the oxidised PTH molecules within the microspheres nor on the measured amount of n-oxPTH molecules in the sample supernatant or flow through. The stabilized membrane-coated microspheres (microcapsules) can be used in as adsorption material in spin columns (3000 g for 60 seconds) or be added as beads directly to the reaction volume. The square of the correlation coefficient $R^2$ between the n-oxPTH values obtained after an analytical pre-treatment with a conventional affinity column (150 µl heparin plasma sample with 60 µl slurry n-oxPTH-affinity material) and the n-oxPTH values obtained after immersion with membrane-coated alginate/0,05 g maize starch spheres (150 µl heparin plasma sample and 24 spheres) was $R^2$=0,8433 (n=96).

The invention claimed is:

1. A method of obtaining a sorbent material for immunological pre-treatment of a biological liquid, wherein the sorbent material comprises microcapsules obtainable by:
   (i) solubilizing antibodies in a physiological buffer containing 0.3 to 2.5 percent by weight alginic acid producing a solution and dropping the solution into an aqueous buffer containing ions of a two-valent salt to precipitate alginate cores with diameters from 0.5 to 5.0 millimeters and volumes ranging from 0.1 to 50 microlitres;

(ii) alternately immersing the alginate cores in a polycationic macropolymer liquid buffer solutions and a polyanionic macropolymer liquid buffer solution to achieve a layer-by-layer electrostatic deposition and form macroion-rich liquid-liquid phases on the alginate cores;

(iii) hardening said macroion-rich liquid-liquid phases by complex coacervation at ambient temperatures for a period of time to obtain microcapsules consisting of precipitated alginate cores each surrounded by a multilayered macroion membrane;

(iv) lyophilizing the microcapsules to yield multilayer macroion membranes that are permeable to proteins with molecular weights no greater than about 100,000 Daltons producing semipermeable microcapsules; and (v) conditioning said semipermeable microcapsules and, optionally, classifying the semipermeable microcapsules to render them suitable for addition to biological fluids for immunological treatment and removal of peptidic components smaller than 100,000 Daltons.

2. The method of claim 1, wherein said polycationic macropolymer liquid buffer solution comprises a polycation macropolymer selected from the group consisting of branched polyethylenimine, polyallylamine or polyvinylamine having average molecular weights Mn from about 100,000 to 2,000,000 Daltons.

3. The method of claim 1, wherein said polyanionic macropolymer liquid buffer solution comprises a polyanion macropolymer selected from the group consisting of pectin (poly-D-galacturonic acid methyl ester) having a molecular weight Mn from about 20,000 to 200,000 Daltons, polyacrylic acid having a molecular weight Mn from about 10,000 to 350,000 Daltons, and carboxymethylcellulose having a molecular weight Mn from about 80,000 to 1,000,000 Daltons.

4. The method of claim 1, wherein the multilayer macroion membrane comprises intermediate layers and/or an external layer comprising a polyglycan selected from the group consisting of polyaminosaccharide, chitosan, alginic acid, glycosaminoglycan and hyaluronic acid.

5. The method of claim 1, wherein the alginate cores further comprise 1 to 10% (w/v) of a filler material selected from the group consisting of polymeric carbohydrates, polysaccharides, amylopectin, pectin, polyglucan, polyxylan, wheat starch, maize (corn) starch, potato Starch, rice starch and cassava.

6. A method of pretreating plasma or serum in an automated test system for removal of components interfering with a quantitative measurement of analyte, the method comprising:

contacting said plasma or serum with microcapsules obtained from a method comprising:

(i) Solubilizing antibodies in a Physiological buffer containing 0.3 to 2.5 Percent by weight alginic acid producing a solution and dropping the solution into an aqueous buffer containing ions of a two-valent salt to precipitate alginate cores with diameters from 0.5 to 5.0 millimeters and volumes ranging from 0.1 to 50 microliters;

(ii) Alternately immersing the alginate cores in a polycationic macropolymer liquid buffer solution and a polyanionic macropolymer liquid buffer solution to achieve a layer-by-layer electrostatic deposition and form macroion-rich liquid-liquid phases on the alginate cores;

(iii) Hardening said macroion-rich liquid-liquid phases by complex coacervation at ambient temperatures for a period of time to obtain microcapsules consisting of precipitated alginate cores each surrounded by a multilayered macroion membrane;

(iv) Lyophilizing the microcapsules to yield multilayer macroion membranes that are permeable to proteins with molecular weights no greater than about 100,000 Daltons, producing semipermeable microcapsules; and (v) Conditioning said semipermeable microcapsules and, optionally, classifying the semipermeable microcapsules to render them suitable for addition to biological fluids for immunological treatment and removal of peptidic components smaller than 100,000 Daltons.

7. The method of claim 6, wherein the analyte is non-oxidised human parathyroid hormone (PTH).

8. A lyophilized microcapsule obtained by a method comprising:

(i) solubilizing antibodies in a physiological buffer comprising from about 0.3% to about 2.5% by weight alginic acid to form an antibody-containing alginic acid solution;

(ii) introducing said antibody-containing alginic acid solution into an aqueous buffer comprising ions of a divalent salt to precipitate alginate cores, said alginate cores having diameters ranging from about 0.5 mm to about 5.0 mm and volumes ranging from about 0.1 µL to about 50 µL;

(iii) alternately immersing said alginate cores in a polycationic macropolymer liquid buffer solutions and a polycationic macropolymer liquid buffer solution to achieve layer-by-layer electrostatic deposition and form macroion-rich liquid-liquid phases embedding said alginate cores;

(iv) hardening said macroion-rich liquid-liquid phases by complex coacervation at ambient temperature for a period of time sufficient to form microcapsules comprising precipitated alginate cores surrounded by multilayered macroion membranes;

(v) lyophilizing said microcapsules to produce multilayered macroion membranes that are permeable to proteins having molecular weights of up to about 100,000 Daltons to produce semipermeable microcapsules;

(vi) conditioning said semipermeable microcapsules, and optionally classifying said microcapsules, to render them suitable for addition to biological fluids for immunological treatment and removal of peptidic components having molecular weights less than about 100,000 Daltons; wherein the polycationic macropolymers are selected from the group consisting of linear or branched polyethylenimine, polyallylamine or polyvinylamine having an average molecular weight Mn of about 100,000 to 2,000,000 Daltons, and the polyanionic macropolymers are selected from the group consisting of pectin (poly-D-galacturonic acid methyl ester) having a molecular weight Mn from about 20,000 to 200,000 Daltons, polyacrylic acid having a molecular weight Mn from about 10,000 to 350,000 Daltons, and carboxymethylcellulose having a molecular weight Mn from about 80,000 to 1,000,000 Daltons.

9. The microcapsules of claim 8, wherein the polycationic and polyanionic macropolymers are separated or have been coated with an intermediate layer and/or an external layer comprising a polyglycan selected from the group consisting of polyaminosaccharide, chitosan, alginate, glycosaminoglycan and hyaluronic acid.

10. The microcapsules of claim 8, wherein said polycationic macropolymer liquid buffer solution comprises branched polyethylenimine having an average molecular weight Mn of about 500,000 to 2,000,000 Daltons.

* * * * *